United States Patent [19]

Rumpel

[11] Patent Number: 4,480,852

[45] Date of Patent: Nov. 6, 1984

[54] INDEPENDENT REAR WHEEL SUSPENSION HAVING A PIVOTABLE CONNECTION BETWEEN TWO TRANSVERSE CONTROL ARMS

[75] Inventor: Manfred Rumpel, Birmingham, Mich.

[73] Assignee: Ford Motor Company, Dearborn, Mich.

[21] Appl. No.: 559,835

[22] Filed: Dec. 8, 1983

Related U.S. Application Data

[63] Continuation-in-part of Ser. No. 334,334, Dec. 24, 1981, abandoned.

[51] Int. Cl.³ .............................................. B60G 3/00
[52] U.S. Cl. .................................... 280/663; 280/666; 280/670; 280/672; 280/673; 280/701
[58] Field of Search ............. 280/660, 663, 666, 667, 280/670, 672, 673, 675, 702, 705, 711, 713, 714, 724, 726; 267/66

[56] References Cited

U.S. PATENT DOCUMENTS

| | | | |
|---|---|---|---|
| 2,005,513 | 6/1935 | Weaver | 280/726 |
| 2,070,775 | 2/1937 | Bell | 280/666 |
| 2,171,157 | 8/1939 | Mathews | 280/660 |
| 2,305,820 | 12/1942 | Wagner | 280/666 |
| 2,842,230 | 7/1958 | Macpherson | 280/666 |
| 3,024,040 | 3/1962 | Müller | 280/660 |

*Primary Examiner*—Robert R. Song
*Attorney, Agent, or Firm*—Jerome R. Drouillard; Roger L. May

[57] ABSTRACT

An independent rear wheel suspenison for a motor vehicle having front wheel drive includes a telescopic strut rigidly mounted to a wheel support member and having its upper end pivotably mounted to the vehicle chassis. Two laterally extending control arms are pivotably connected at their outboard ends to the wheel support member and at their inboard ends to the vehicle chassis. The two control arms are longitudinally spaced apart and the wheel spindle is longitudinally positioned between the two arms. One arm has an integrally formed spring seat which seats a coil spring interposed between the arm and the vehicle chassis. The two control arms are connected together through a resilient bushing that is constructed to control the amount of wheel recession. In addition, the suspension can be constructed to control the toe angle of the rear wheel during jounce or recession of the rear wheel.

21 Claims, 8 Drawing Figures

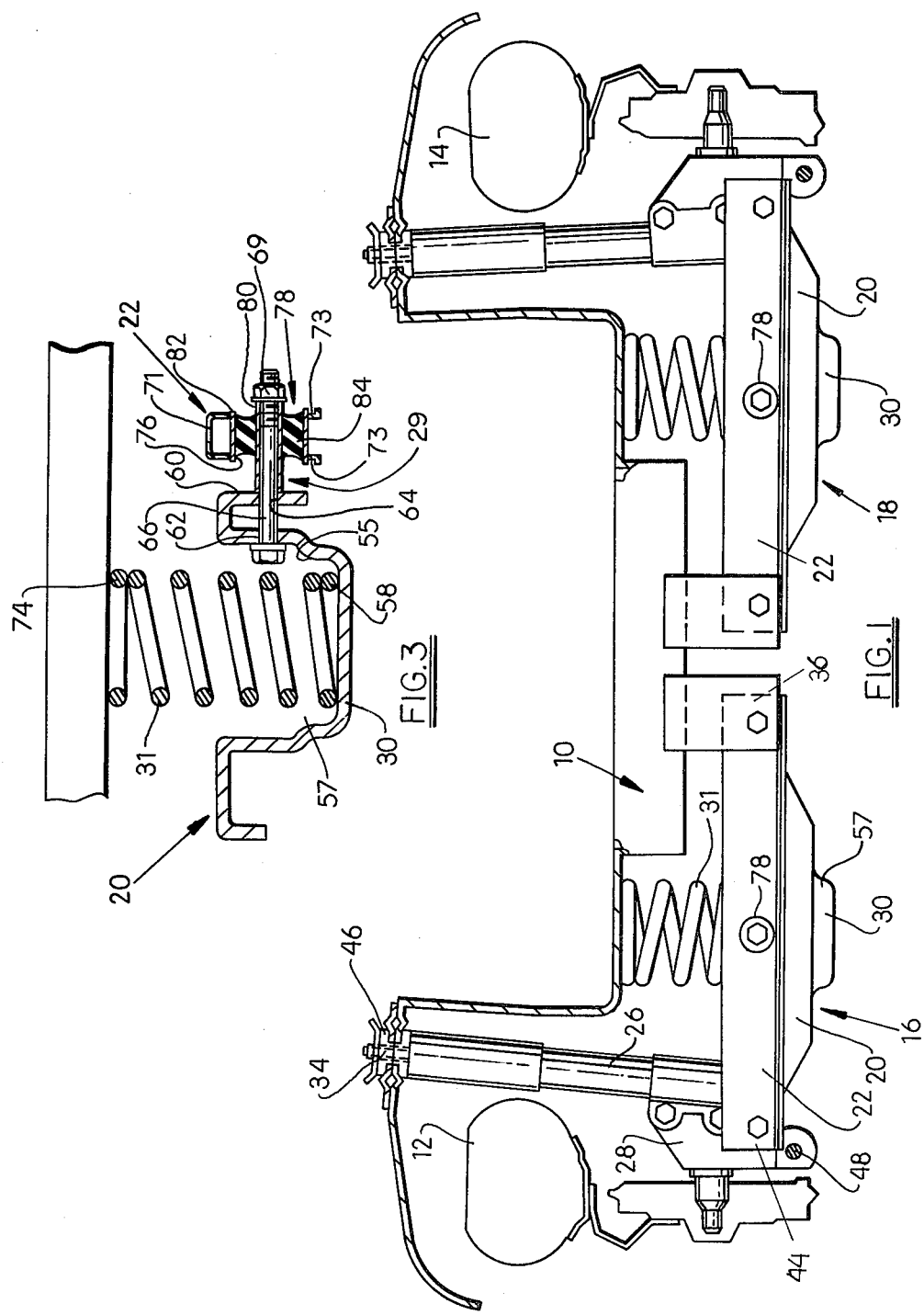

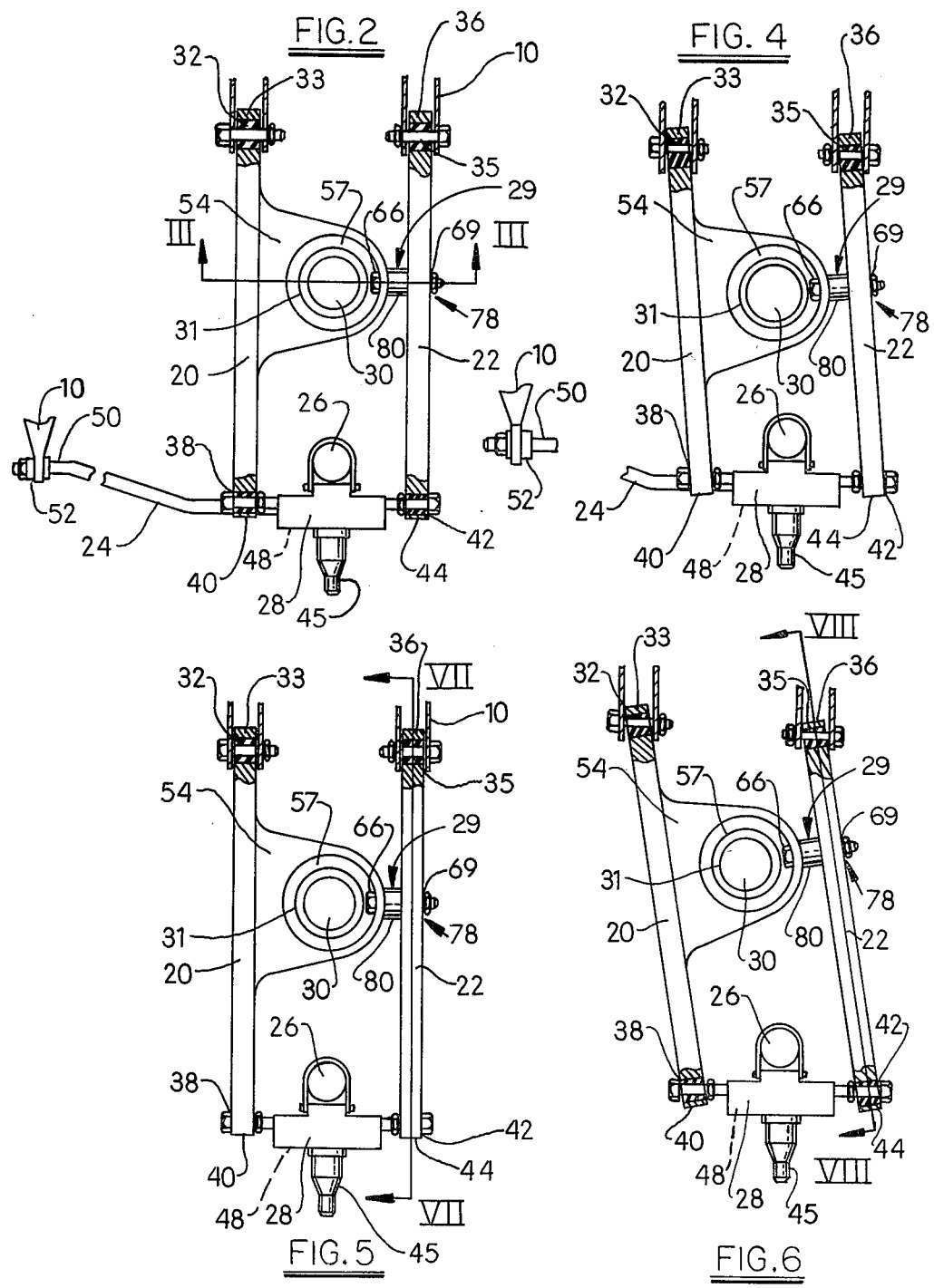

INDEPENDENT REAR WHEEL SUSPENSION HAVING A PIVOTABLE CONNECTION BETWEEN TWO TRANSVERSE CONTROL ARMS

This application is a continuation-in-part of application Ser. No. 334,334, filed Dec. 24, 1981 now abandoned.

BACKGROUND OF THE INVENTION

1. Field of the Invention

This invention relates generally to independent wheel suspension systems for motor vehicles and more particularly to a strut type independent rear suspension for a front wheel drive vehicle.

2. Disclosure Information

Rear suspension systems have been constructed to control the attitude of the rear wheels in order to provide particular handling characteristics of the motor vehicle, for example roll understeer, roll oversteer, or roll neutral steer, as well as to provide a soft ride free from road vibrations. Handling characteristics such as roll understeer, roll oversteer, or roll neutral steer during cornering of a motor vehicle are achieved by controlling the toe angle of one of the rear wheels during the jounce stroke of the suspension.

A vibration free ride is enhanced if the rear wheels are allowed to recess when the wheel hits a bump. However, both wheel recession and steering stability must be taken into account when designing a rear suspension. One way to take both factors into account is by controlling the toe angle of the wheel during its recession.

One way to control the toe angle of a wheel is with a suspension having two control arms substantially transverse to the longitudinal axis of the vehicle. The arms control the toe-in of the wheel as they shift positions.

However, previous usage of the two transverse control arms in combination with a strut suspension necessitated the spring element in the strut suspension to be mounted about the strut.

In many strut suspensions other than those using two transverse arms, the spring commonly has been positioned away from the strut and interposed between a transverse control arm and the chassis so that the strut upper mount can be constructed from softer rubber, and secondly, available cargo space or engine compartment space can be maximized.

SUMMARY OF THE DISCLOSURE

In accordance with the present invention, an independent rear wheel suspension for a vehicle includes a chassis, a wheel support member, a telescopic shock absorbing strut rigidly secured at its lower end to the wheel support member and connected at its upper end to the chassis, and control arms pivotably connected to the chassis and the wheel support member. The control arms are longitudinally spaced from each other and substantially transverse to the longitudinal axis of the motor vehicle. A spring seat is integrally formed with the front control arm for seating a bottom end of a coil spring. The front control arm is connected through a resilient bushing to the rear control arm at a position between the inboard and outboard ends. The top end of the coil spring abuts the chassis of the motor vehicle.

It is desirable that the connection between the front control arm and rear control arm include a rubber bushing that resiliently flexes under side loads exerted thereon.

The broader aspects of the present invention are directed to a chassis, a wheel support member, and front and rear control arms which extend substantially transverse to the longitudinal axis of the chassis. The control arms are connected through a connection at their inboard ends and their outboard ends to the chassis and wheel support member, respectively. The connection is constructed to allow rotation in a horizontal plane of the two arms. The connection also allows spring loads exerted on one arm to be transferred in part to said other arm. A spring seat is rigidly connected to at least one of the control arms and and seats a spring means interposed between the spring seat and the chassis.

A suspension according to the present invention provides for increased cargo or engine space. Secondly, it allows the use of softer rubber in the strut upper mount. Furthermore, it provides the above features in a suspension that can provide roll understeer, roll oversteer or roll neutral steer, as well as wheel recession. Another aspect of the present invention provides for eliminating the necessity of a longitudinally extending link member to control wheel recession.

BRIEF DESCRIPTION OF THE DRAWINGS

Reference is now made to the accompanying drawings in which:

FIG. 1 is a rear elevational view, partly in section, of a motor vehicle incorporating independent rear wheel suspensions for its left and right rear wheels according to the invention;

FIG. 2 is a plan view of the left rear wheel suspension shown in FIG. 1;

FIG. 3 is a cross-sectional view taken along the line 3—3 shown in FIG. 2;

FIG. 4 is a view similar to FIG. 2 showing the suspension during wheel recession;

FIG. 5 is a plan view similar to FIG. 2 showing a second embodiment of a rear wheel suspension;

FIG. 6 is a plan view similar to FIG. 5 showing the second embodiment during wheel recession;

DETAILED DESCRIPTION OF THE PREFERRED EMBODIMENTS

Figure 7:
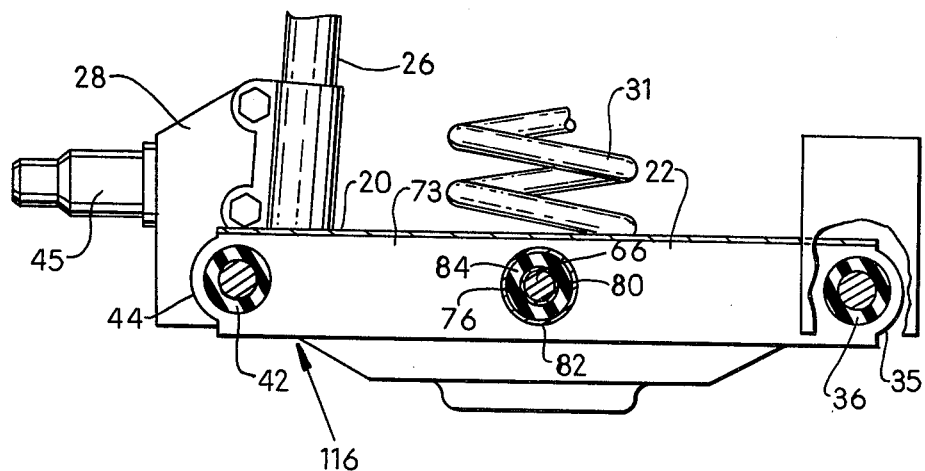
FIG. 7 is a cross-sectional view taken along the line VII—VII in FIG. 5.

Referring now to FIG. 1, a motor vehicle chassis (or unitized body and chassis) 10 is supported on left and right road wheels 12 and 14 by novel left and right independent wheel suspensions 16 and 18. Each wheel suspension 16 and 18 is identical except that one is a mirror image of the other; i.e., one is for the left side rather than for the right side. Since each independent suspension is the same, reference will only be made to the left wheel suspension 16.

Generally, as shown in FIGS. 1 and 2, the wheel suspension 16 includes a front transverse control arm 20, a rear transverse control arm 22, trailing arm 24, and a telescopic strut 26 which connects a wheel support member 28 to the motor vehicle chassis 10. Means are provided to pivotably connect the inner ends of the arms 20, 22 to the chassis 10 and their outer ends to the wheel support member 28, as will be described. A spring seat 30 is integrally formed in control arm 20 and seats a coil spring 31 interposed between the seat 30 and chassis 10. The control arm 20 is pivotably connected to control arm 22 at a mid-portion thereof through a pivotable connection 29.

The front arm 20 has an elastomeric bushing 32 at its inboard end 33 which pivotably connects the arm 20 to the chassis 10. Similarly, the rear arm 22 has a resilient bushing 35 at its inboard end 36 which pivotably connects the arm 22 to the chassis 10. An elastomeric bushing 38 pivotably connects the outboard end 40 of the front control arm 20 to the wheel support member 28. Similarly, a resilient bushing 42 pivotably connects outboard end 44 of the rear control arm 22 to the wheel support member 28.

The wheel support member 28 has an integral wheel spindle 45 which rotatably mounts wheel 12. The spindle 45 is positioned longitudinally between the bushings 40 and 42. The wheel support member 28 is rigidly connected to the telescopic shock absorbing strut 26. The upper end 34 of the strut 26 is pivotably connected through a resilient upper mount 46 to the chassis 10.

The longitudinal trailing arm 24 is connected through an elastomeric bushing 48 to the wheel support member 28 and extends substantially forward therefrom. The arm 24 has its front end 50 resiliently connected through bushing 52 to the chassis 10.

As shown clearly in FIG. 3, the spring seat 30 is integrally formed with the front control arm 20 at a mid-position between the inboard end 33 and outboard end 40 of the arm 20. The spring seat is recessed from the central area 54 identified in FIGS. 2 and 4–6 and connected thereto by a downwardly extending wall section 55. In general, the recessed seat 30 forms a pocket 57 which receives the lower end 58 of coil spring 31.

The front arm 20 has a vertically extending outer wall 60. As shown in FIG. 3, the vertical wall 60 and wall section 55 have apertures 62 and 64 therethrough which receive a bolt 66.

The rear control arm 22 has a U-shaped cross-section with a top wall 71 and two depending side walls 73. The two side walls 73 have apertures 76 to receive an elastomeric bushing 78. The bushing 78 connects front arm 20 to rear arm 22 via bolt 66.

The bushing 78 includes an inner sleeve 80 which receives the bolt 66, and outer sleeve 82 that fits within apertures 76 and an elastomeric layer 84 bonded therebetween. The inner sleeve 80 has sufficient length to abut wall 60 of the front arm to properly position bushing 78 in the arm 22. The sleeve 80 is retained in place by nut 69 threaded onto bolt 66.

The top end 74 of coil spring 31 is seated against the chassis 10 so that the coil spring 31 normally exerts a downwardly biasing force on the spring seat 30 and both control arms 20 and 22 when the vehicle is at rest.

When the control arms 20 and 22 undergo jounce movement, the arms 20 and 22 pivot upwardly about the inboard bushings 32 and 35. As the arms 20 and 22 pivot upwardly, the spring seat 30 is moved upward with the arm 20 to compress coil spring 31.

Similarly, when the control arms 20 and 22 undergo rebound movement and pivot downwardly about inboard bushings 32 and 35, the spring seat 30 moves downwardly and allows coil spring 31 to elongate.

Arms 20 and 22 and the other suspension components may be arranged to provide an increase in toe-in during jounce of wheel 12. Alternatively, no toe change or toe-out may be provided during jounce of wheel 12. One skilled in the art can provide the appropriate geometry of the various suspension arms that will provide the desired toe angle changes during jounce.

By providing a plurality of resilient bushings in the suspension system, the road wheel may recess when subjected to a longitudinal force such as occurs when the wheel strikes a road obstacle (e.g., a tar strip in concrete pavement). As shown in FIG. 4, the control arms 20 and 22 control the toe angle of the rear wheel 12 during recession of the wheel. Arms 20 and 22 and the other suspension components may be arranged to provide no toe change during recession of the wheel. Alternatively, the arms 20 and 22 may be arranged to provide toe-in as the wheel undergoes recession. The trailing arm 24 controls the amount of recession due to its resilient bushings 48 and 52. The amount of desired recession may be determined by the appropriate choice of elastomeric material used in bushings 48 and 52. The softer the material is, the more recession is allowed. The elastomeric bushing 78 that connects the arm 20 to the arm 22 is resilient to allow control arms 20 and 22 to rotate in substantially identical arcs about vertical axes and in a horizontal plane when the rear wheel 12 undergoes recession. When the wheel 12 regains its normal position, as shown in FIG. 2, the arms 20 and 22 pivot back to their initial position.

As also shown in the figures, the position of the spring near the control arms rather than about strut 26 provides for increased cargo or engine space since the clearance about strut 26 can be minimized. Furthermore, by positioning the spring on arm 20, softer rubber can be used in upper mount 46 than would otherwise be feasible. The spring is positioned on arm 20 without losing any quality in ride. The force of spring 31 is directed to both arms 20 and 22 in equal amounts. The arms 20 and 22, by being connected to the wheel support member 28 on opposite sides of the spindle 45, produce virtually no torque on the wheel support member. The even distribution of the spring force on the wheel support member promotes a vibration free ride.

Reference now will be made to FIGS. 5–8 which disclose a second embodiment. To simplify the discussion, parts that are identical to parts described in the first embodiment are referred to with the same numeral. As shown, the suspension 116 is identical to the first embodiment except that there is no trailing arm. The two arms 20 and 22 control wheel recession by means of the bushing 78. The elastomeric layer of material 84 has sufficiently high shear and compression rates to control wheel recession. When the two arms 20 and 21 are in a free rolling position as shown in FIG. 5, the bolt 66 and inner sleeve 80 are centered within outer sleeve 82 of bushing 78 as shown in FIG. 7.

Figure 8:
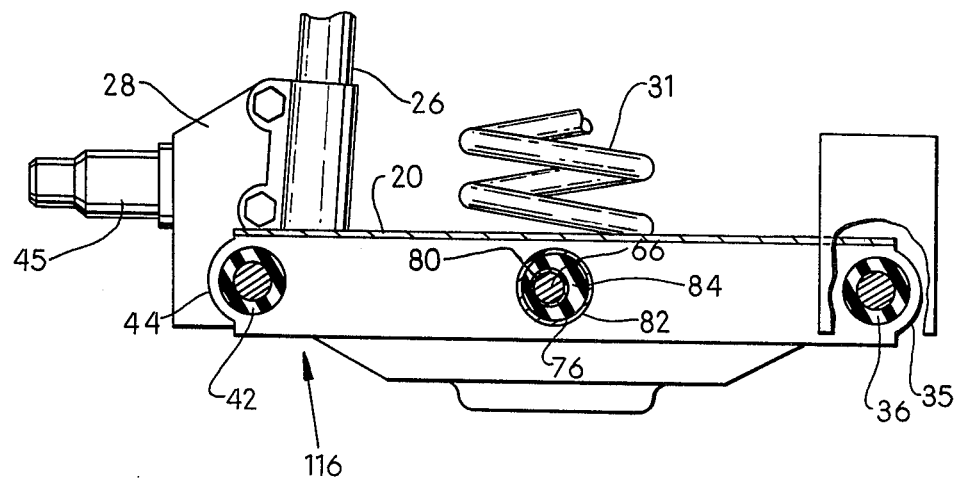
FIG. 8 is a cross-sectional view taken along the line VIII—VIII in FIG. 6.

Forces that cause wheel recession and cause arms 20 and 22 to recess as shown in FIG. 6 are counteracted by the bushing. Wheel recession forces the bolt 66 and inner sleeve 80 to move from their equilibrium position shown in FIG. 7 to a position shown in FIG. 8. When the bushing 78 is distorted as shown in FIG. 8, the elastomeric bushing provides a counteracting force for controlling recession of the wheel. The more off-centered bolt 66 becomes with respect to the bushing 78, the higher the counteracting force becomes. When the wheel recession ceases and the suspension returns to its positions as shown in FIG. 6, the resilient bushing 78 returns to its position in FIG. 7.

Not only does the bushing 78 function to transfer some of the spring load from arm 20 to arm 22, but also it functions as a control against wheel recession.

In this fashion, the suspension as described provides for increased cargo or engine space, allows softer rubber to be used in the strut upper mount, and can be constructed to provide roll understeer, roll oversteer, or roll neutral steer, as well as wheel recession. In addition, wheel recession can be controlled in an efficient manner with a minimum number of parts.

Variations and modifications of the present invention are possible without departing from its spirit and scope as defined by the appended claims.

The embodiments in which an exclusive property or privilege is claimed are defined as follows:

1. An independent rear wheel suspension for a vehicle comprising:
   a chassis;
   a wheel support member being adapted to rotatably mount a wheel;
   an upwardly extending telescopic shock absorber having its lower end rigidly secured to said wheel support member;
   means for pivotably connecting the upper end of said shock absorber to said chassis;
   transversely extending front and rear control arms pivotably connected at their inboard ends to said chassis and at their outboard ends to said wheel support member;
   means integrally formed with one of said arms for seating a spring means interposed between said arm and said chassis; and
   means for connecting said arms together at a point between their outboard and inboard ends so as to transfer spring loads exerted on said one arm to said other arm and to allow rotational movement of said arms in a horizontal plane.

2. An independent rear wheel suspension as defined in claim 1 wherein said means for connecting said arms comprises means for resiliently resisting horizontal displacement of said arms.

3. An independent rear wheel suspension as defined in claim 1 wherein said wheel support member supports said wheel in a position between the outboard ends of said arms.

4. An independent rear wheel suspension as defined in claim 1 further comprising:
   a longitudinal link having one end connected to said chassis and its other end connected to said wheel support member.

5. An independent rear wheel suspension for a vehicle comprising:
   a chassis;
   a wheel support member;
   an upwardly extending telescopic shock absorber having its lower end rigidly secured to said wheel support member;
   means pivotably connecting the upper end of said shock absorber to said chassis;
   transversely extending front and rear control arms pivotably connected at their inboard ends to said chassis and at their outboard ends to said wheel support member;
   a spring seat integrally formed with said front control arms;
   a spring interposed between said spring seat and said chassis; and
   means for connecting said front control arm to said rear arm at a position between said inboard ends and said outboard ends so as to transfer spring loads from said front arm to said rear arm and to allow rotational movement of said arms in a horizontal plane.

6. An independent rear suspension as defined in claim 5 wherein:
   said spring seat is recessed downwardly within said front arm to form a pocket; and
   said spring comprises a coil spring sized to fit within said pocket.

7. An independent rear wheel suspension as defined in claim 6 further comprising:
   a longitudinal link having one end connected to said chassis and its other end connected to said wheel support member.

8. An independent rear wheel suspension for a vehicle comprising:
   a chassis;
   a wheel support member with an attached wheel;
   transversely extending front and rear control arms pivotably connected at their inboard ends to said chassis and at their outboard ends to said wheel support member;
   a spring seat integrally formed with one of said front and rear control arms;
   a spring interposed between said spring seat and said chassis; and
   means for connecting said arms together at a position between said inboard ends and said outboard ends so as to transfer spring loads from said one arm to said other arm and to allow rotation of said arms in a horizontal plane.

9. An independent rear wheel suspension as defined in claim 8 wherein said means for connecting said control arms together at a position between their inboard and outboard ends comprises means for resiliently resisting horizontal displacement of said arms.

10. An independent rear wheel suspension as defined in claim 8 wherein said wheel support member supports said wheel between the outboard ends of said arms.

11. An independent rear wheel suspension as defined in claim 8 wherein:
    said spring seat is integral with said front control arm and recessed downwardly within said front control arm to form a pocket;
    said spring comprises a coil spring having its lower end sized to fit within said pocket.

12. An independent rear wheel suspension as defined in claim 11 further comprising:
    a longitudinal link having one end connected to said chassis and its other end connected to said wheel support member.

13. An independent rear wheel suspension for a vehicle comprising:
    a chassis;
    a wheel support member with an attached wheel;
    an upwardly extending telescopic shock absorber having its lower end rigidly secured to said wheel support member;
    means for pivotably connecting the upper end of said shock absorber to said chassis;
    transversely extending front and rear control arms pivotably connected at their inboard ends to said chassis and at their outboard ends to said wheel support member;
    a spring seat rigidly connected to one of said front and rear control arms;
    a spring interposed between said spring seat and said chassis; and means for connecting said spring seat to said other of said front and rear control arms so as to transfer, in part, spring loads exerted on said spring seat to said other of said front and rear control arms and to allow horizontal displacement of said spring seat and said other arm.

14. An independent rear wheel suspension as defined in claim 13 wherein said means for connecting said spring seat and said other control arm comprises
means for resiliently resisting horizontal displacement of said spring seat and said other arm.

15. An independent rear wheel suspension as defined in claim 13 wherein said wheel support member supports said wheel between the outboard ends of said arms.

16. An independent rear wheel suspension as defined in claim 13 wherein said means for resiliently resisting horizontal displacement of said spring seat and said other arm comprises an elastomeric bushing.

17. An independent rear wheel suspension for a motor vehicle comprising:
a chassis;
a wheel support member;
an upwardly extending telescopic shock absorber having its lower end rigidly secured to said wheel support member;
means for pivotably connecting the upper end of said shock absorber to said chassis;
a first transversely extending control arm pivotably connected at its inboard end to said chassis and at its outboard end to said wheel support member;
a second transversely extending control arm positioned in front of said first control arm and having its outboard end pivotably connected to said wheel support member;
a resilient bushing connecting said first transversely extending control arm to said second transversely extending control arm at a position between their inboard ends and outboard ends so as to resiliently resist recessive movement of said transverse arms when said arms pivot in a rearward direction;
a spring seat rigidly connected to said second control arm; and
a spring interposed between said spring seat and said chassis.

18. An independent rear wheel suspension for a vehicle comprising:
a chassis;
a wheel support member being adapted to rotatably mount a wheel;
an upwardly extending telescopic shock absorber having its lower end rigidly secured to said wheel support member;
means pivotably connecting the upper end of said shock absorber to said chassis;
transversely extending front and rear control arms pivotably connected at their inboard ends to said chassis and at their outboard ends to said wheel support member;
a resilient bushing connecting said control arms at a position between their inboard ends and outboard ends so as to resiliently resist recessive movement of said transverse arms when said arms pivot in a rearward direction about their inboard ends.

19. An independent rear wheel suspension for a vehicle comprising:
a chassis;
a wheel support member;
transversely extending front and rear control arms pivotably connected at their inboard ends to said chassis and at their outboard ends to said wheel support member;
a spring seat integrally formed with one of said front and rear control arms;
a spring interposed between said spring seat and said chassis; and
a resilient bushing connecting said control arms at a position between their inboard ends and outboard ends so as to resiliently resist relative movement of said transverse arms when said arms pivot in a rearward direction about their respective inboard ends.

20. An independent rear wheel suspension as defined in claim 19 wherein said bushing comprises:
an inner sleeve extending axially toward one of said arms;
a coaxial outer sleeve;
an elastomeric material coaxially positioned between said inner and outer sleeves and bonded thereto;
means on one of said arms for abutting said inner sleeve;
means for securing said inner sleeve to said one arm; and
an aperture in the other of said arms for receiving said outer sleeve such that recessive movement of both arms causes said inner sleeve to translationally move with respect to said outer sleeve and thereby displace said elastomeric material so as to produce a counteracting force in response to any force which causes said recessive movement.

21. An independent rear wheel suspension for a motor vehicle comprising:
a chassis;
transversely extending front and rear control arms pivotably connected at their inboard ends to said chassis;
a wheel support member pivotably connected to the outboard ends of said control arms and supporting a wheel between said outboard ends of said arms;
a spring seat operably connected to one of said first and rear control arms and seating a spring interposed between said spring seat and said chassis; and
means for connecting said arms together at a position between said inboard ends of said outboard ends so as to transfer spring loads exerted on said one arm to said other arm.

* * * * *